United States Patent [19]

Holbrook et al.

[11] Patent Number: 5,016,176

[45] Date of Patent: May 14, 1991

[54] METHOD OF IN-GEAR TOLERANCE CONTROL

[75] Inventors: Gerald L. Holbrook, Rochester Hills; Maurice B. Leising, Clawson, both of Mich.

[73] Assignee: Chrysler Corporation, Highland Park, Mich.

[21] Appl. No.: 351,693

[22] Filed: May 12, 1989

[51] Int. Cl.⁵ ................. B60K 41/18; G05D 17/02
[52] U.S. Cl. ................... 364/424.1; 74/866
[58] Field of Search ............ 369/424.1; 74/866, 867; 192/44, 90

[56] References Cited

U.S. PATENT DOCUMENTS

| | | | |
|---|---|---|---|
| 4,843,922 | 7/1989 | Kashihara | 74/866 |
| 4,870,581 | 9/1989 | Ito et al. | 364/424.1 |
| 4,875,391 | 10/1989 | Leising et al. | 74/866 |
| 4,893,527 | 1/1990 | Furusawa et al. | 74/866 |
| 4,899,858 | 2/1990 | Cote et al. | 192/9 |

Primary Examiner—Felix D. Gruber
Attorney, Agent, or Firm—Mark P. Calcaterra

[57] ABSTRACT

A method of in-gear tolerance (IGT) control continuously calculates the magnitude to slip or IGT to be used during a shift. The method calculates the indicated slip while the transmission is in-gear conditions and then freezing the current value for use when a shift is initiated.

9 Claims, 1 Drawing Sheet

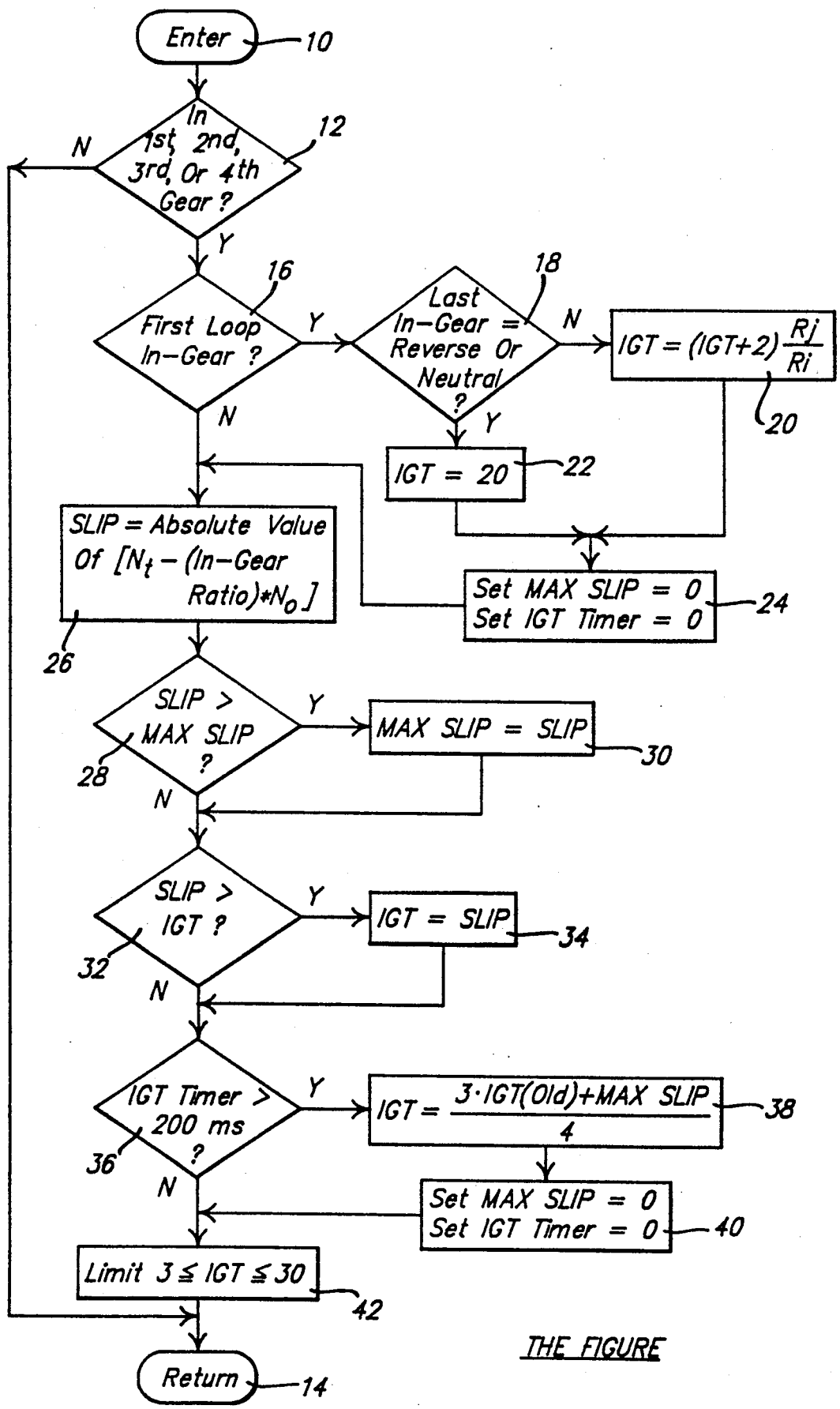
THE FIGURE

METHOD OF IN-GEAR TOLERANCE CONTROL

BACKGROUND OF THE INVENTION

1. Field of the Invention

The present invention relates generally to an automatic transmission primarily intended for motor vehicle use, and more particularly, to a method of in-gear tolerance control for a transmission that is controlled electronically and hydraulically.

2. Description of Related Art

In recent years, an advanced form of transmission control has been proposed, which offers the possibility of enabling an automatic transmission to adapt itself to changing conditions. In this regard, U.S. Pat. No. 3,956,947, issued on May 18, 1976 to Leising, et al., sets forth a fundamental development in this field. Specifically, this patent discloses an automatic transmission design which features an "adaptive" control system that includes electrically operated solenoid-actuated valves for controlling certain fluid pressures. In accordance with this electric/hydraulic control, the automatic transmission would be "responsive" to an acceleration factor for controlling the output torque of the transmission during a shift from one ratio of rotation (between the input and output shafts of the transmission) to another. Specifically, the operation of solenoid-actuated valves would cause a rotational speed versus time curve of a sensed rotational component of the transmission to substantially follow along a predetermined path during shifting.

Currently, there exists a comprehensive four-speed automatic transmission system which features fully adaptive electronic control. An example of such a transmission control system is disclosed in copending application, Ser. No. 187,772, filed Apr. 29, 1988 and entitled "AN ELECTRONICALLY-CONTROLLED, ADAPTIVE AUTOMATIC TRANSMISSION SYSTEM" by inventors Leising et al, which is commonly owned by the assignee of the present application. The transmission control system includes a microcomputer-based controller which receives input signals indicative of engine speed, turbine speed, output speed (vehicle speed), throttle angle position, brake application, predetermined hydraulic pressures, driver selected gear or operating condition (PRNODDL), engine coolant temperature, and/or ambient temperature. This controller generates command or control signals for causing the actuation of a plurality of solenoid-actuated valves which regulate the application and release of pressure to and from the frictional units of the transmission system. Accordingly, the controller will execute predetermined shift schedules stored in the memory of the controller through appropriate command signals to the solenoid-actuated valves and the feedback which is provided by various input signals.

Whenever the automatic transmission for the above control system is operating in an in-gear condition (i.e., reverse, 1st, 2nd, 3rd, or 4th gear), there is a specific known ratio that exists between the transmission's input and output shaft speeds for the given in-gear condition. Input and output speed sensors of the transmission are continuously being monitored to provide the controller with the speed data necessary to perform various control tasks. Significantly important to good shift quality with adaptive controls is the ability to rapidly identify when a friction element begins to slip during a shift. This slip is typically identified whenever the calculated input speed is different than the product of the current gear ratio times the calculated output speed by a predetermined amount called "in-gear-tolerance (IGT)". The magnitude of IGT is highly dependent on the actual physical tolerance of the teeth on the sensed speed gears, the speed sensor tooth detection circuitry, the current in-gear ratio, and actual component speeds. The effects of rough road surfaces also needs to be considered in IGT to prevent possible false identification of slip due to road generated noise. Adding an amount to IGT for rough roads, however, can result in delaying the identification of slip when operating the vehicle on a smooth road surface.

It is, therefore, one object of the present invention to provide a method of determining and controlling the in-gear tolerance.

It is another object of the present invention to provide a variable in-gear tolerance.

It is a further object of the present invention to provide an adaptive in-gear tolerance.

SUMMARY OF THE INVENTION

To achieve the foregoing objects, the present invention is an algorithm or logic which continuously calculates the magnitude of IGT to be used during a shift. This is essentially accomplished by calculating the indicated slip while actually in in-gear conditions and then freezing the current value for use as IGT when a shift is initiated.

One advantage of the present invention is that the use of a fixed IGT is eliminated. Another advantage of the present invention is that the IGT is variable and/or adaptive. A further advantage of the present invention is that the adaptive IGT logic helps in identifying problems (excessive IGT) during final transmission test stand check out and also can help improve diagnostics in the field.

BRIEF DESCRIPTION OF THE DRAWING

The FIGURE is a flow chart of an in-gear tolerance methodology according to the present invention.

DESCRIPTION OF THE PREFERRED EMBODIMENT

The methodology of the present invention can be used or incorporated in a transmission system as disclosed in copending application, Ser. No. 187,772, filed Apr. 29, 1988, now U.S. Pat. No. 4,875,391, and entitled "AN ELECTRONICALLY-CONTROLLED, ADAPTIVE AUTOMATIC CONTROL SYSTEM" by inventors Leising et al, which is hereby incorporated by reference.

Referring to the FIGURE, an in-gear tolerance (IGT) methodology according to the present invention is shown. The methodology enters through bubble 10 and advances to diamond 12. In diamond 12, the methodology determines whether the transmission (not shown) is in first (1st), second (2nd), third (3rd) or fourth (4th). If the transmission is not in-gear, the methodology retains the last or previous value of IGT if a shift is in progress and advances to bubble 14. In bubble 14, the methodology returns or exits.

If the transmission is in first, second, third or fourth gear, the methodology advances to diamond 16 and determines whether the transmission is on the first pass or loop of the methodology in the current in-gear condition. If so, the methodology advances to diamond 18 and determines whether the last or previous in-gear condition of the transmission equals reverse (R) or neutral (N). If not, a shift between 1st, 2nd, 3rd or 4th gears has just been completed and the methodology advances to block 20 and sets the IGT variable equal to the following equation:

$$IGT = (IGT + 2) * Rj/Ri$$

In other words, the IGT is set equal to the previous learned value of IGT plus a first predetermined value such as two (2) times or multiplied by the quotient of the current gear ratio (Rj) divided by the gear ratio (Ri) of the previous in-gear condition. In other words, a shift has just completed resulting in a gear ratio change from Ri to Rj. The previous value of IGT is thus adjusted based on this rate change to provide a more accurate initial value of IGT for the new in-gear condition.

In diamond 18, if the last in-gear value does equal reverse or neutral, the methodology advances to block 22 and sets the value of IGT equal to a predetermined value such as twenty (20). The methodology then advances from blocks 20 and 22 to block 24 and sets the values of maximum slip (MAX SLIP) variable and IGT timer equal to a second and third predetermined value, respectively, such as zero. The methodology then advances to block 26 to be described. Additionally, if the transmission is not in-gear on the first loop in diamond 16, the methodology advances to block 26. It should be appreciated that if the methodology is in the first pass or loop, the methodology advances through diamond 18 and blocks 20 through 24 to initialize variables such as IGT.

In block 26, the methodology calculates the value of indicated slip (SLIP) each loop of the methodology according to the following equation:

$$SLIP = ABSOLUTE\ VALUE\ OF\ N_t - (IN\text{-}GEAR\ RATIO) * N_o$$

where $N_t$ equals the turbine speed and $N_o$ equals the output speed. In other words, the SLIP is calculated by multiplying the output speed $N_o$ by the in-gear ratio, which value is subtracted from the turbine speed $N_t$. The methodology then advances to diamond 28 and determines whether the value of SLIP is greater than the value of the MAX SLIP. If so, the methodology advances t block 30 and sets or retains the value of the MAX SLIP equal to the value of the SLIP calculated in block 26. The methodology then advances to diamond 32. If the value of SLIP is not greater than the value of MAX SLIP, the methodology advances to diamond 32.

In diamond 32, the methodology determines whether the value of SLIP calculated in clock 26 is greater than the current value of IGT. If so, the methodology advances to block 34 and sets or retains the value of SLIP for the current value of IGT. The methodology then advances to diamond 36. If the value of SLIP is not greater than IGT in diamond 32, the methodology advances to diamond 36.

In diamond 36, the methodology determines whether the value of the IGT timer is greater than a predetermined time value such as two hundred milliseconds (200 MS). If so, the methodology advances to block 38 and sets IGT equal to the following equation:

$$(3 * IGT(OLD) + MAX\ SLIP)/4$$

In other words, IGT is calculated by a fourth predetermined value such as three (3) multiplied by the old or previous value of IGT, which value is added to MAX SLIP and that product is divided by a fifth predetermined value such as four (4). The methodology then advances to block 40 and sets the value of the MAX SLIP and IGT timer equal to a sixth and seventh predetermined value, respectively, such as zero. The methodology then advances to block 42. If the IGT timer is not greater than the predetermined time value in diamond 36, the methodology advances to block 42. It should be appreciated that if the IGT timer is greater than the predetermined value, the methodology slowly reduces IGT by a weighted average.

In block 42, the methodology limits IGT equal or greater to a eighth predetermined value such as three (3) and equal or less than a ninth predetermined value such as thirty (30). The methodology then advances to bubble 14 and returns.

The present invention has been described in an illustrative manner. It is to be understood that the terminology which has been used is intended to be in the nature of words of description rather than of limitation.

Obviously, many modifications or variations are possible in light of the above teachings. Therefore, within the scope of the appended claims, the present invention may be practiced otherwise than as specifically described.

What is claimed is:

1. In a vehicle having a transmission including an input member, an output member, a gear assembly for changing the ratio of torque between the input member and output member, a plurality of input sensors for providing signals indicative of measurement data for predetermined conditions, and a controller having memory for processing and storing the signals and predetermined values and providing output signals, a method of determining and controlling the in-gear tolerance (IGT) of the transmission, said method comprising the steps of:

sensing the speed of the input member and output member by the input sensors;

calculating by the controller the speed of the input member and output member based on the sensed speeds;

determining whether the transmission is operating in one of a plurality of in-gear condition;

exiting if the transmission is not operating in one of a plurality of in-gear conditions;

calculating by the controller the magnitude of IGT to be used during a shift based on the calculated speeds if the transmission is operating in one of a plurality of in-gear conditions; and controlling the transmission using the calculated magnitude of IGT.

2. A method as set forth in claim 1 wherein said step of calculating the magnitude of IGT comprises:

calculating the current slip by the speed of the input member minus the product of the current in-gear ratio multiplied by the speed of the output member;

determining whether the value of the calculated slip is greater than the current value of IGT; and if the value of the calculated slip is greater than the current value of IGT, setting IGT equal to the calculated slip for use as the IGT when a shift is initiated by the controller.

3. A method as set forth in claim 2 including the step of initializing the value of IGT on the first pass of the method with the transmission in one of a plurality of in-gear conditions.

4. A method as set forth in claim 3 including the step of determining whether the value of calculated slip is greater than a maximum value of slip; and
   if the value of calculates slip is greater than the maximum value of slip, setting the maximum value of slip equal to the calculated slip.

5. A method as set forth in claim 4 including the step of initializing the value for a maximum value of slip and an IGT timer on the first pass of the method.

6. A method as set forth in claim 5 including the step of determining whether the value of IGT timer is greater than a predetermined value.

7. A method as set forth in claim 6 including the steps of:
   limiting the value of IGT between first and second predetermined values if the value of the IGT timer is not greater than the predetermined value; and
   calculating the value of IGT based on previous IGT values if the value of the IGT timer is greater than the predetermined value.

8. In a vehicle having a transmission including an input member, an output member a gear assembly for changing the ratio of torque between the input member and output member, a plurality of input sensors for providing signals indicative of measurement data for predetermined conditions, and a controller having memory for processing and storing the signals and predetermined values and providing output signals, a method of determining and controlling the in-gear tolerance (IGT) of the transmission, said method comprising the steps of:
   sensing the speed of the input member and output member by the input sensors;
   calculating by the controller the speed of the input member and output member based on the sensed speeds;
   determining whether the transmission is operating in one of a plurality of in-gear conditions;
   exiting if the transmission is not operating in one of a plurality of in-gear conditions;
   if the transmission is operating in one of a plurality of in-gear conditions, initializing the value of IGT, a maximum value of slip, and an IGT timers by the controller on the first pass of the method;
   calculating by the controller the current slip by the calculated speed of the input member minus the product of the current in-gear ratio multiplied by the calculated speed of the output member;
   determining whether the value of the calculated slip is greater than the current value of IGT;
   if the value of the calculated slip is greater than the current value of IGT, setting IGT equal to the calculated slip by the controller; and
   controlling the transmission using the IGT value when a shift is initiated.

9. In a vehicle having a transmission including an input member, an output member, a gear assembly for changing the ratio of torque between the input member and output member, a plurality of input sensors for providing signals indicative of measurement data for predetermined conditions, and a controller having memory for processing an storing the signals and predetermined values and providing output signals, a method of determining and controlling the in-gear tolerance (IGT) of the transmission, said method comprising the steps of:
   sensing the speed of the input member and output member by the input sensors;
   calculating by the controller the speed of the input member and output member based on the sensed speeds;
   determining whether the transmission is operating in one of a plurality of in-gear conditions;
   exiting if the transmission is not operating in one of a plurality of in-gear conditions;
   if the transmission is operating in one of a plurality of in-gear conditions, initializing the value of IGT, a maximum value of slip and an IGT timer by the controller on the first pass of the method;
   calculating by the controller the current slip by the calculated speed of the input member minus the product of the current in-gear ratio multiplied by the calculated speed of the output member;
   determining whether the value of calculated slip is greater than a maximum value of slip;
   if the value of calculated slip is greater than the maximum value of slip, setting the maximum value of slip equal to the calculated slip;
   determining whether the value of IGT timer is greater than a predetermined value;
   limiting the value of IGT between first and second predetermined values if the value of the IGT timer is not greater than the predetermined value;
   calculating by the controller the value of IGT based on previous IGT values if the value of the IGT timer is greater than the predetermined value; and
   controlling the transmission using the calculated value of IGT.

* * * * *